(12) United States Patent
Brown et al.

(10) Patent No.: US 11,888,748 B2
(45) Date of Patent: Jan. 30, 2024

(54) ENFORCING ACCESS TO ENDPOINT RESOURCES

(71) Applicant: Itron, Inc., Liberty Lake, WA (US)

(72) Inventors: Scott Dale Brown, Raleigh, NC (US); Andrew Keats, Seneca, SC (US); Matthew Rockey, Raleigh, NC (US); Jason Estes, Spokane, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 18/092,042

(22) Filed: Dec. 30, 2022

(65) Prior Publication Data
US 2023/0139970 A1 May 4, 2023

Related U.S. Application Data

(63) Continuation of application No. 17/213,145, filed on Mar. 25, 2021, now Pat. No. 11,570,111.

(51) Int. Cl.
*H04L 47/20* (2022.01)
*H04L 47/125* (2022.01)
*H04L 9/32* (2006.01)

(52) U.S. Cl.
CPC ............ *H04L 47/20* (2013.01); *H04L 9/3236* (2013.01); *H04L 9/3263* (2013.01); *H04L 47/125* (2013.01)

(58) Field of Classification Search
CPC ..... H04L 47/20; H04L 9/3236; H04L 9/3263; H04L 47/125
See application file for complete search history.

(56) References Cited

U.S. PATENT DOCUMENTS

| | | | |
|---|---|---|---|
| 6,080,202 A | 6/2000 | Strickland et al. | |
| 2008/0010455 A1 | 1/2008 | Holtzman et al. | |
| 2008/0155647 A1* | 6/2008 | Miyawaki | H04L 63/0227 726/1 |
| 2020/0403843 A1 | 12/2020 | Qiu | |

\* cited by examiner

*Primary Examiner* — Duc C Ho
(74) *Attorney, Agent, or Firm* — Lee & Hayes P.C.

(57) ABSTRACT

Techniques are directed to controlling access to resources on a message bus of a network communication device. The techniques may include, by the network communication device, processing a message bus access policy file uniquely corresponding to a process. The message bus access policy file may include a certificate securely associating the message bus access policy file with the process. The techniques may further include, by the network communication device, based at least in part on the processing the message bus access policy file, exposing one or more resources of the network communication device to the process on the message bus, in a manner corresponding to at least one resource access permission indication contained within the message bus access policy file.

20 Claims, 7 Drawing Sheets

ENFORCING ACCESS TO ENDPOINT RESOURCES

RELATED APPLICATIONS

This application is a continuation of and claims priority to U.S. patent application Ser. No. 17/213,145, now U.S. Pat. No. 11,570,111, filed Mar. 25, 2021, titled "ENFORCING ACCESS TO ENDPOINT RESOURCES," the entirety of which is incorporated herein by reference.

BACKGROUND

An internet of things (IoT) endpoint, such as one that includes metrology for measuring electricity usage, may include a message bus system to facilitate communication between agents executing on the endpoint and resources of the endpoint. For example, the message bus system may include a D-BUS (short for "Desktop Bus"), which is a messaging protocol developed as part of the freedesktop.org project to standardize services provided by Linux desktop environments. D-Bus provides a software-bus abstraction that gathers all the communications between a group of processes over a single shared virtual channel.

For example, the processes may include processes that expose capabilities and/or features of an IoT endpoint for consumption by IoT endpoint agent processes. For example, the IoT endpoint may be a communicating smart electric meter, and such capabilities and/or features may include, for example, a load control switch that may be configured to selectively enable and disable energy loads. The capabilities and/or features may further include, for example, gathering of high-speed data related to energy usage and other energy-related parameters, peer-to-peer communications with another smart electric meter or other communicating device, via a communication medium, and/or communication with and/or control of devices connected to a home area network.

Multiple agents on the IoT endpoint may have access to the capabilities and/or features of the IoT endpoint, which could result in resource overload and/or threats to privacy and/or security. For example, multiple agents may access the communication capabilities, which may overload the available communication bandwidth. As another example, agents accessing high speed data, such as electricity usage data, may pose a threat to customer privacy. As yet another example, agents accessing load control switches and/or the communication medium may pose a threat to security, such as by nefariously or mistakenly disabling energy loads and/or flooding the communication medium.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

As discussed above, multiple agents on an internet of things (IoT) endpoint may have access to the capabilities and/or features of the IoT endpoint, which could result in resource overload and/or threats to privacy and/or security. Among other things, the disclosed techniques may provide a mechanism to intelligently enforce access to the capabilities and/or features of the IoT endpoint. An agent is a, typically small, executable that is installed in a container on an IoT endpoint. An agent may include multiple features, each feature generating some outcome data.

This disclosure describes techniques directed to controlling access to resources on a message bus of a network communication device. The techniques may include, by the network communication device, processing a message bus access policy file uniquely corresponding to a process. The message bus access policy file may include a certificate securely associating the message bus access policy file with the process. The techniques may further include, by the network communication device, based at least in part on the processing the message bus access policy file, exposing one or more resources of the network communication device to the process on the message bus, in a manner corresponding to at least one resource access permission indication contained within the message bus access policy file.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein are applicable to any communications network, control network, and/or another type of network or system. In one example, the techniques may be implemented in the context of the Internet of Things (IoT).

Example Environment

Figure 1:
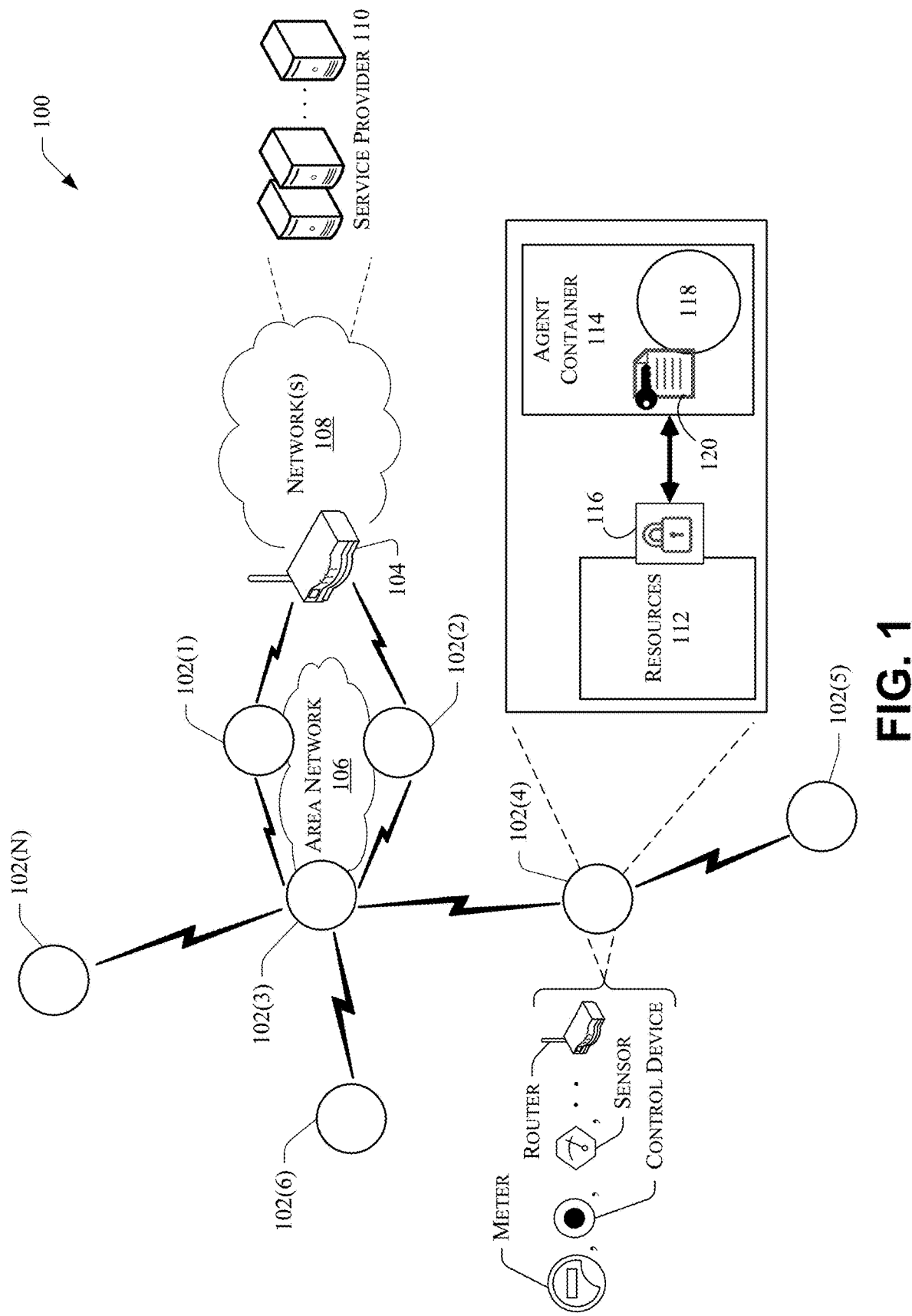
FIG. 1 is a diagram illustrating an example networked environment or architecture in which at least one network communication device includes an access control function that controls access by the agents executing on the network communication device to resources of the network communication device.

FIG. 1 is a diagram illustrating an example networked environment or architecture 100. The architecture 100 includes multiple network communication devices 102(1)-

102(N) (collectively referred to as "network communication devices 102") and a network communication device 104, where N is any integer greater than or equal to 1. The network communication devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108. The network communication device 104 may be considered, for example, a root node of the AN 106. For at least some purposes, the network communication device 104 may be considered a destination network node (at least an intermediate destination) for communications from the network communications devices 102.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data throughout the AN 106. Alternatively, or additionally, the AN 106 may comprise a star network, in which a central device acts as a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to generate and/or exchange data.

The service provider 110 may be physically located in a single central location, or it may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the network communication devices 102, the network communication device 104, and/or the service provider 110 may communicate according to various modulation schemes that are available to it and perform processing to determine and indicate a preferred link to use for communication. Available modulation schemes may differ by modulation type and/or by data rate.

The network communication devices 102, such as the network communication device 102(4), may comprise, for example, a utility meter and/or other sensor, a control device or a router. These are examples, and the network communication device 102 may instead or in addition comprise other functionality.

The network communication devices 102, such as the network communication device 102(4), may each include resources 112 as well as an agent container 114. At least a portion of the resources 112 and the agent container 114 may be implemented, for example, using a Linux-based processor executing instructions to cause the processor to perform particular operations. The resources 112 may include features such as firmware that, when executed by one or more processors of the network communication device 102(4), causes the one or more processors to perform operations to facilitate communication with other network communication devices 102. As another example, the resources 112 may include features of the network communication device 102(4) such as access to data and/or control corresponding to environmental measurements or control being made by electronics of the network communication device 102(4), such as metering electricity usage, sensing electrical line voltage, controlling a switch to enable and/or disable electricity consumption by a device and/or determining communication metrics corresponding to communication with other network communication devices 102.

The agent container 114 may include one or more agents 118 to accomplish distributed intelligence (DI) application functionality in the network communication device 102(4). For example, each DI application may include one or more agents 118, where an agent is included a "container" and includes code that, when executed by a processor of the network communication device 102(4), implement a set of features that comprise the DI application. A feature may perform some discrete function and/or produce some output such as calculating that electrical line voltage being measured by a sensor of the network communication device 102(4) has fallen below some threshold and raising an event. DI applications are made up of a collection of features, and a feature can be a part of more than one DI application.

An agent may, for example, be developed in C++ and the agents may execute by a processor of the network communication device 102(4) within a Linux Container (LXC) that enforces access to and control of the resources 112 by the agents. Application programming interfaces (APIs) enable the agents to access resources 112 of the network communication device 102(4), including to communicate with the service provider 110.

An access control function 116 controls access by the agents (e.g., the agent 118) to the resources 112. More particularly, the agent 118 has associated with it a policy file 120. The policy file 120 may include, for example, a digest representing a value achieved by applying a cryptographic algorithm to a binary executable file corresponding to the agent, to tightly couple the policy file 120 to a specific version of the agent 118. In some examples, the digest may be a hash of the binary executable code of the agent 118, achieved by applying a secure hash algorithm to the binary executable code of the agent 118. The policy file 120 is included within an agent package, which is signed. Operationally, there may be no method provided to download the policy file 120 to the network communication device 102(4) outside of an agent package. Thus, for example, if the policy file 120 is to be modified (e.g., to indicate to the access control function 116 a different access control configuration for the agent 118), this will typically be done operationally via an upgrade of the agent 118. That is, a new agent package, including the policy file 120 as modified, will be downloaded to the network communication device 102(4).

Once an agent package (including the agent 118 and the policy file 120) is downloaded to the network communication device 102(4), a copy of the policy file 120 may be stored outside the agent container 114 to a location accessible to the access control function 116. This may thwart the agent 118 from changing the policies associated with the agent 118, as indicated by the policy file 120, while the agent 118 is being executed.

As mentioned above, the policy file 120, tied to the agent 118 (and, furthermore, to a particular version of the agent 118), may include a hash of the binary executable of the agent 118. The process of downloading an agent package that includes the agent 118 may also include the network communication device 102(4) performing a check of the hash versus the binary of the agent 118. Upon installation of the agent 118, the network communication device 102(4) may confirm that the hash in the policy file 120 is consistent with the binary of the agent 118.

The network communication device 102(4) may also check the hash in the process of the agent 118 registering on the network communication device 102(4). This may help to ensure that the agent 118 is identifying itself correctly during the registration process and, furthermore, has not been modified since passing a certification process prior to the policy file 120 being included in an agent package with the agent 118. This may, for example, minimize the probability of another agent spoofing the agent 118, such as when the policy file 120 associated with the agent 118 indicates a more permissive resource access policy than a policy file associated with the other agent.

As an example, the policy file 120 may indicate, to the access control function 116, such resource access permission as an amount of resources 112 the agent 118 is permitted to consume prior to the access control function 116 raising an alarm or blocking the agent 118 from further consumption of the resources 112. As another example, the policy file 120 may indicate, to the access control function 116, an amount of network communication traffic the agent is allowed to generate within a particular period, such as within a twenty-four-hour period. In an instance in which the access control function 116 blocks the agent 118 from generating additional communication traffic, the agent 118 may include logic for determining what to do with data that it is blocked by the access control function 116 from communicating over the network. Furthermore, the policy file 120 may indicate to the access control function 116 to which data of the resources 112 the agent 118 is allowed to subscribe (and thus receive). Thus, for example, the policy file 120 may be utilized by the service provider 110 to limit what data of the resources 112 a third-party application may access according to a revenue-generating agreement with the third party and/or customers of the third party.

In some examples, the access control function 116 may provide an agent access to some, typically limited, default portion of the resources 112 in the absence of a policy file 120 corresponding to the agent. For example, the access control function 116 may provide the agent the following default access to the resources 112:

ability to communicate 10 kB of agent outcome data, per twenty-four-hour period;
ability to communicate 15 kB of data in a peer-to-peer manner, per twenty-four-hour period;
metrology data (i.e., data indicating utility usage, such as electricity usage), but not access to other data of the resources 112.

Example Network Communication Device

Figure 2:
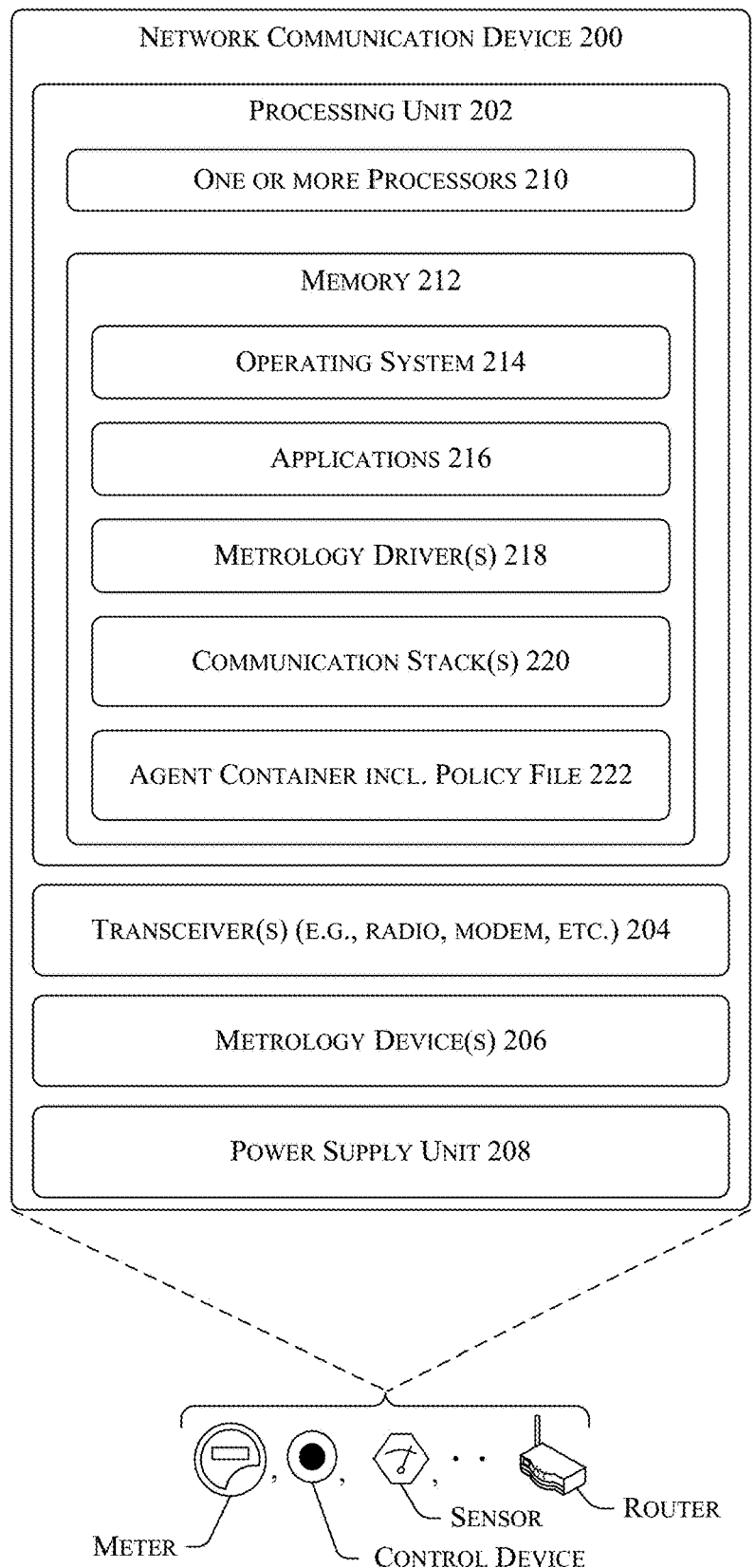
FIG. 2 is a diagram showing details of an example network communication device.

FIG. 2 is a diagram showing details of an example network communication device 200, such as any of the network communication devices 102 or the network communication device 104. The network communication device 200 may comprise any type of network communication device (sometimes referred to as a node, network node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/ transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, computer system(s) in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 may comprise a Full Function Device (FFD), while in other instances the network communication device 200 may comprise a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 may comprise physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as an FFD, the power supply unit 208 comprises a mains power connector that couples to an Alternating Current (AC) or Direct Current (DC) mains power line where the network communication device 200 is installed. In other instances, such as when the network communication device 200 is implemented as an LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 may include an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also include a portion 222 storing agent containers for agents (programming instructions) that comprise DI applications. The portion 222 may also store policy files that indicate to what resources of the network communication device 200 various agents may access when executed by the one or more processors 210.

The memory 212 of the network communication device 200 may include software functionality configured as one or more "modules." The modules are intended to represent example divisions of software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Figure 3:
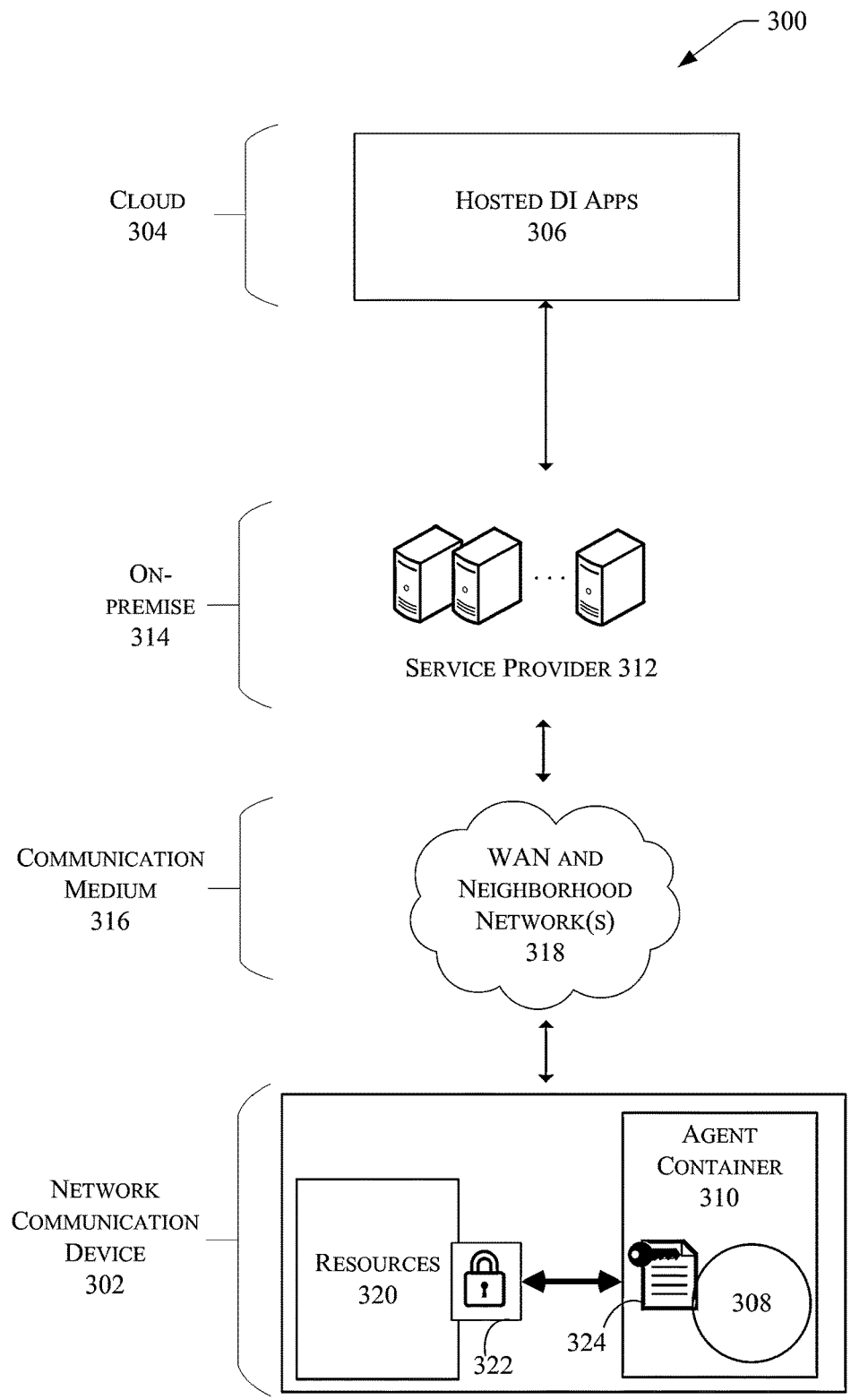
FIG. 3 is a block diagram illustrating an example system and showing the context of a network communication device, within the system including a cloud, wherein the cloud may provide a platform for hosted distributed intelligence (DI) applications.

FIG. 3 is a block diagram illustrating a system 300 and showing the context of a network communication device 302, within the system including a cloud 304. For example, the cloud 304 may provide a platform for hosted DI applications 306, such as analytics applications and/or applications for network configuration and/or communication. The hosted DI applications 306 in the cloud 304 may include, for example, applications for electrical grid optimization, applications for electricity consumer transformation, and applications for distributed energy resources integration. The hosted DI applications 306 in the cloud 304 may interface with one or more agents, such as the agent 308 in an agent container 310 of the network communication device 302 and possibly also with other network communication devices.

For example, the hosted DI applications 306, residing at least partly in the cloud 304, may interact with the agent 308 via the service provider 312 (which may be physically located on-premise 314 of a utility or other enterprise) and via a communication medium 316 that may include, for example, a WAN and/or neighborhood networks 318. The service provider 312 may include, for example, a client proxy service that operates as described in RFC 7252, "The Constrained Application Protocol (CoAP)," dated June 2014 and as described in RFC 7641, "Observing Resources in the Constrained Application Protocol (CoAP)," dated September 2015. The client proxy service may expose to the host DI applications 306 a forward proxy for read/write access to network communication endpoints, including the network communication device 302. The service provider 312 may also include a security manager that enables secure communications and data privacy between endpoints and authorized data collection systems in the system 300. In some examples, the hosted DI applications 306 may communicate with the agent 308 via the communication medium 316 without going through the service provider 312.

Similar to that shown in FIG. 1, the network communication device 302 may include resources 320 and an access control function 322, that controls access by one or more agents in an agent container 310 (e.g., the agent 308) to the resources 320. For example, the access control function 322 may access a policy file 324 associated with the agent 308 to determine which of the resources 320 the agent 308 is allowed to access.

Figure 4:
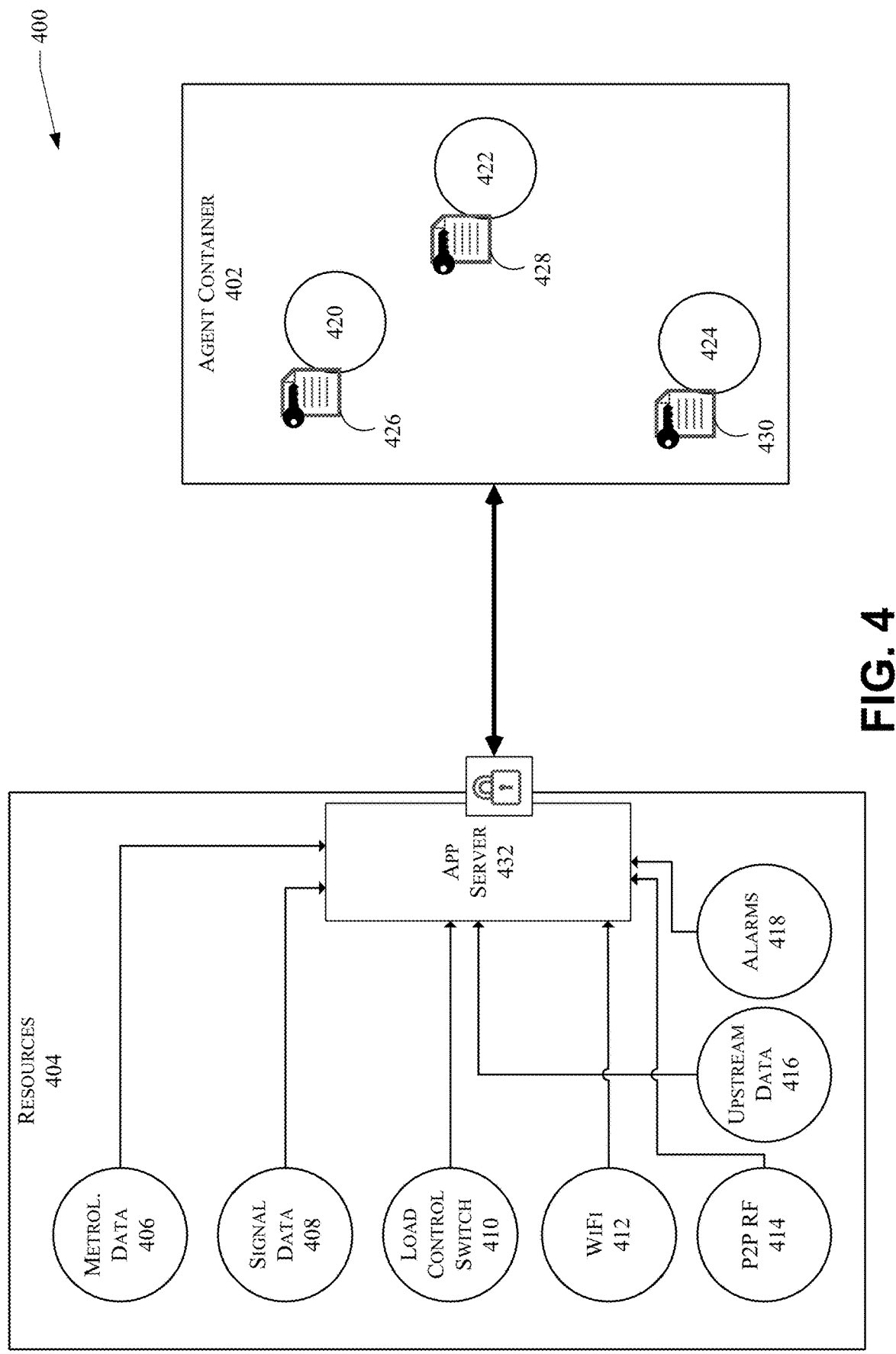
FIG. 4 is a block diagram illustrating an example of an agent container of a network communication device interoperating with resources of the network communication device.

FIG. 4 is a block diagram illustrating how an agent container 402 may interoperate with resources 404 of a network communication device 400. The resources 404 may include, for example, metrology data 406, signal data 408, one or more load control switches 410, access to WiFi communication medium 412, peer-to-peer communication 414, upstream data 416 and alarms 418. These are examples, and some network communication devices may have different resources.

The agent container 402 may include one or more agents, including the agent 420, the agent 422 and the agent 424. Each of the agent 420, the agent 422 and the agent 424 has associated with it a corresponding policy file 426, policy file 428 and policy file 430, respectively. The contents of each of the policy file 426, the policy file 428 and the policy file 430 governs which elements of the resources 404 the respective agent 420, agent 422 and agent 424 can access. Each of the policy file 426, the policy file 428 and the policy file 430 may indicate, for the corresponding agent 420, 422 and 424, respectively:

Elements of the resources 404 allocated to the agent;
Types of data of the resources 404 to which the agent may subscribe;
Other agent data to which the agent may subscribe;
Communication limits of the agent;
Communication mediums of the resources 404 the agent can use; and
an execution priority of the agent with respect to other agents.

For example, each of the policy file 426, the policy file 428 and the policy file 430 may include the hash of the executable code of the corresponding agent 420, agent 422 and agent 424, respectively, to tightly couple each policy file to the corresponding agent, including to a specific version of the agent. Each policy file and corresponding agent may be downloaded to the network communication device as part of an agent package, which is signed. Thus, for example, if a policy file is to be modified (e.g., to indicate different policies for an agent with respect to the resources 404), a new agent package will be downloaded to the network communication device 400.

After download, the network communication device 400 may copy the policy file to a location outside the signed agent package, which may allow an Application Server (AppServer) 432 access to the policy file. The AppServer 432 is a library that controls internal communication logic and data flow on the network communication device 400. The AppServer 432 processes the policy file 426, the policy file 428 and the policy file 430, as appropriate, to regulate access by the corresponding agent 420, agent 422 and agent 424 to resources 404. In some examples, only the elements of the resources 404 relevant to a particular agent are indicated within the corresponding policy file. The App-Server 432, by default, may not allow an agent access to any element of the resources 404 that are not included in the policy file for the agent.

Each policy file may be tied to a specific agent version and include a hash of the executable binary of the agent. After the signed agent package is downloaded to it, the network communication device 400 may confirm that the hash in the policy file of the agent package is valid, based on the executable binary of the agent in the signed agent package. The network communication device 400 may also confirm, upon installing the agent, that the hash in the policy file corresponding to the agent is valid, based on being the same as the hash of the executable binary of the agent being installed. Furthermore, the network communication device 400 may also verify the hash when the agent is registered to the network communication device 400. This may ensure that the agent is identifying itself correctly, that is, that it is the same agent that was downloaded in the signed agent package. This may prevent an agent from spoofing another agent that may have a more permissive policy for access to elements of the resources 404.

The policy file may be comprised of eXtensible Markup Language (XML) statements, organized as categories of an ordered labelled tree. For example, one category of XML statements may pertain to the agent to which the policy file corresponds. The agent node may include identifying information about the agent to which the policy file corresponds, both descriptive and functional elements. Functional elements may include, for example:

Priority: Priority of the agent relative to other agents, between 1 and 5. For example, "1" may signify last to terminate and "5" may signify first to terminate.

Hash: SHA256 hash of the Agent executable

Another category of XML statements in the policy file may indicate the amount of certain resources of the network communication device an agent may be allowed to consume at runtime. For example, these XML statements may indicate for random access memory (RAM), the maximum amount of RAM in kilobytes the agent may be allowed to consume at runtime. As another example, these XML statements may indicate, for non-volatile memory, the amount of non-volatile memory an agent may be allowed to allocate at runtime. As yet another example, these XML statements may indicate an amount of CPU utilization of the network communication device an agent may be allowed to consume at runtime, such as by percentage of total available CPU utilization.

Another category of XML statements in the policy file may indicate permissions that an agent may request while executing, which corresponds to application programming interfaces (APIs) the agent may be allowed to access while executing. Permission nodes may be structured as a tree, with a ":" separating each level; a "*" following a ":" may indicate that all nodes at that level and any nodes descending from that level are being requested. In some example, the XML file may include corresponding extra nodes to describe the requested permissions.

An example policy file is shown below, for an example agent in an example network communication device that includes electricity usage metrology circuitry:

```
See <PolicyFile xmlns:xsi="http://www.w3.org/2001/XMLSchema-instance"
xsi:noNamespaceSchemaLocation="PolicyFileSchema_v1.4.xsd">
<!-- Relevant Agent ID, Name, Version, and Priority level -->
<Agent ID="4294967295" Name="TestAgent" Version="1.0.1" Priority="1"
Hash="68b1282b91de2c054c36629cb8dd447f12f096d3e3c587978dc2248444633483">
<!-- ram in kbytes, cpu in % of total cpu, flash in kbytes -->
<Resources Ram="256000" Cpu="100.0" Flash="256000"/>
<Permissions>
<!-- See separate diagram for permission node trees.
Any parent node can be requested by itself, which is a request for all child nodes.-->
<Permission name="Data:Subscription:Metrology:Partial"/>
<Permission name="Data:NeighborTable"/>
<Permission name="Data:PON"/>
<Permission name="Data: Subscription:Agent"/>
<Permission name="Data:Identity:Partial"/>
<Permission name="Data:Publish"/>
<Permission name="Network:P2P"/>
<Permission name="Network:Upstream"/>
<Permission name="Network:WiFi"/>
<Permission name="HAN:LFDI"/>
</Permissions>
<Functions>
<Features>
<!-- Visibility is mostly here for AppStore usage:
- public: Visible, publishes data, subscribable
- private: device internal, does not publish data.
Subscribable indicates whether other agents are allowed to subscribe.
AppStore can validate other agent policy files are valid vs this, and AppServ can restrict
subscriptions based on this policy. -->
<Feature ID="4294967290" description="LD" visibility="public" subscribable="y">
<NetworkData>
<!-- dailyDataLimit: daily upstream data transmission limit in kilobytes dailyAlarmLimit:
daily number of alarms that can be sent upstream.-->
<Upstream dailyDataLimit="1000" dailyAlarmLimit="100"/>
<!-- broadcastDataLimit: number of bytes that can be added to the P2P broadcast
dailyUnicastDataLImit: number of kilobytes that can be unicast to peers on a daily basis.-
->
<P2P broadcastDataLimit="100" dailyUnicastDataLimit="1000"/>
<WiFi>
<Ports>
```

```
<Port portNo="443" type="TCP/UDP"/>
<Port portNo="4000" type="UDP"/>
</Ports>
</WiFi>
</NetworkData>
</Feature>
<Feature ID="4294967289" description="LD-algo" visibility="private"/>
</Features>
<Metrology>
<!-- Needed for "Data.Subscription.Metrology.Partial" permission -->
<LIDS>
<LID value="18153512" description="Wh/D"/>
<LID value="18153513" description="Wh/R"/>
<LID value="1139671040" description="VAR/h Uni"/>
</LIDS>
</Metrology>
<!-- Needed for "Data.Identity.Partial" permission -->
<Identity>
<LIDS>
<LID value="1139671041" description="FW Version"/>
<LID value="1139671042" description="Meter form"/>
</LIDS>
</Identity>
<!-- Calls out specific agent / feature subscription requests -->
<!-- Publishing data does not require explicit feature permission -->
<FeatureData>
<!-- Can call out specific requested feature data -->
<Feature ID="4294967292" description="LD-Disagg-Results"/>
<Feature ID="4294967291" description="LD-Disagg-Calculations"/>
</FeatureData>
</Functions>
</Agent>
</PolicyFile>
```

Referring to the example policy file above, the "features" node specifies how the agent may publicize data about the features that agent supports, information about each feature and the permission requests for the feature. For each feature, the policy file may specify whether the feature is public or private, and whether the feature may be subscribed to by other agents. In particular, the "visibility" node in the policy file specifies whether a feature is public or private. A public feature may publish externally visible data outside of the network communication device. Features are private by default, or may be specified as private. A private feature may only provide data internally to the network communication device.

The "subscribable" node in the policy file specifies whether other agents can subscribe to the data of this feature. The "subscribable" node is specified as "none" by default, such that other agents cannot subscribe to the data of this feature or there is no available feature data. The "subscribable" node may be specified as "internal," indicating that only other agents on the same network communication device may subscribe to the data of this feature. The "subscribable" node may otherwise be specified as "external," indicating that agents either on the same network communication device or on other network communication devices may subscribe to the data of this feature.

With the "NetworkData" node, the policy file may indicate specific network data limits for each feature. For example, indicated limits may be specified as follows:

Upstream dailyDataLimit—Maximum kilobytes per day allowed for transmission to the service provider.
dailyDataWarningLimit—Threshold for daily upstream data amount that will trigger a warning response to the data sending DI-Agent application and a 'Warning'-entry in DI Policy violation digest. This is an optional attribute.
dailyAlarmLimit—Maximum number of alarms per day allowed for transmission to head-end systems.
dailyAlarmWarningLimit—Threshold for number of Agent alarms that will trigger a warning response to the sending DI-Agent application and a 'Warning'-entry in DI Policy violation digest. This is an optional attribute.

P2P (Peer-to-Peer)

broadcastDataLimit—Maximum bytes that can be added to the P2P broadcast.
broadcastDataWarningLimit—Maximum bytes that can be added to the P2P broadcast. This is an optional attribute.
dailyUnicastDataLimit—Maximum kilobytes per day allowed for transmission via P2P unicast.
dailyUnicastDataWarningLimit—Maximum kilobytes per day allowed for transmission via P2P unicast. This is an optional attribute.

In some examples, if any of the network data limits are not specified in the policy file, the network data limits are treated as being specified as zero, indicating that no network transmission of that type is allowed for the feature.

Another node in the policy file is the "metrology" node. If the "metrology" node is not specified, this may indicate that an agent may access available metrology information from the network communication device. Otherwise, the "metrology" node may be specified to indicate the agent is allowed access to only part of the metrology information. The parts of the metrology information to which the agent is to be allowed access may be specified by including one or more Logically Identifiable Data (LID) indicators in this node. A LID is effectively a pointer to a data elements within the network communication device. For example, if the network communication device is a metrology device, such as a smart utility meter, LIDs may point to metrology data, network-related data and data generated internally by the network communication device. Such data may include, for example, current resource consumption or internal device temperature.

Another node is the "identity" node. If the "identity" node is not included, this indicates the corresponding agent may request permission to access all available identifying information about the network communication device. If the "identity" node is included, then the listed LIDs indicate which identifiers the corresponding agent may access.

Yet another node is the "FeatureData" node. Without the "FeatureData" node in the policy file, the AppServer may not allow the corresponding agent to subscribe to data provided by another agent. A specified FeatureID indicates that the agent may subscribe to the corresponding feature.

Figure 5:
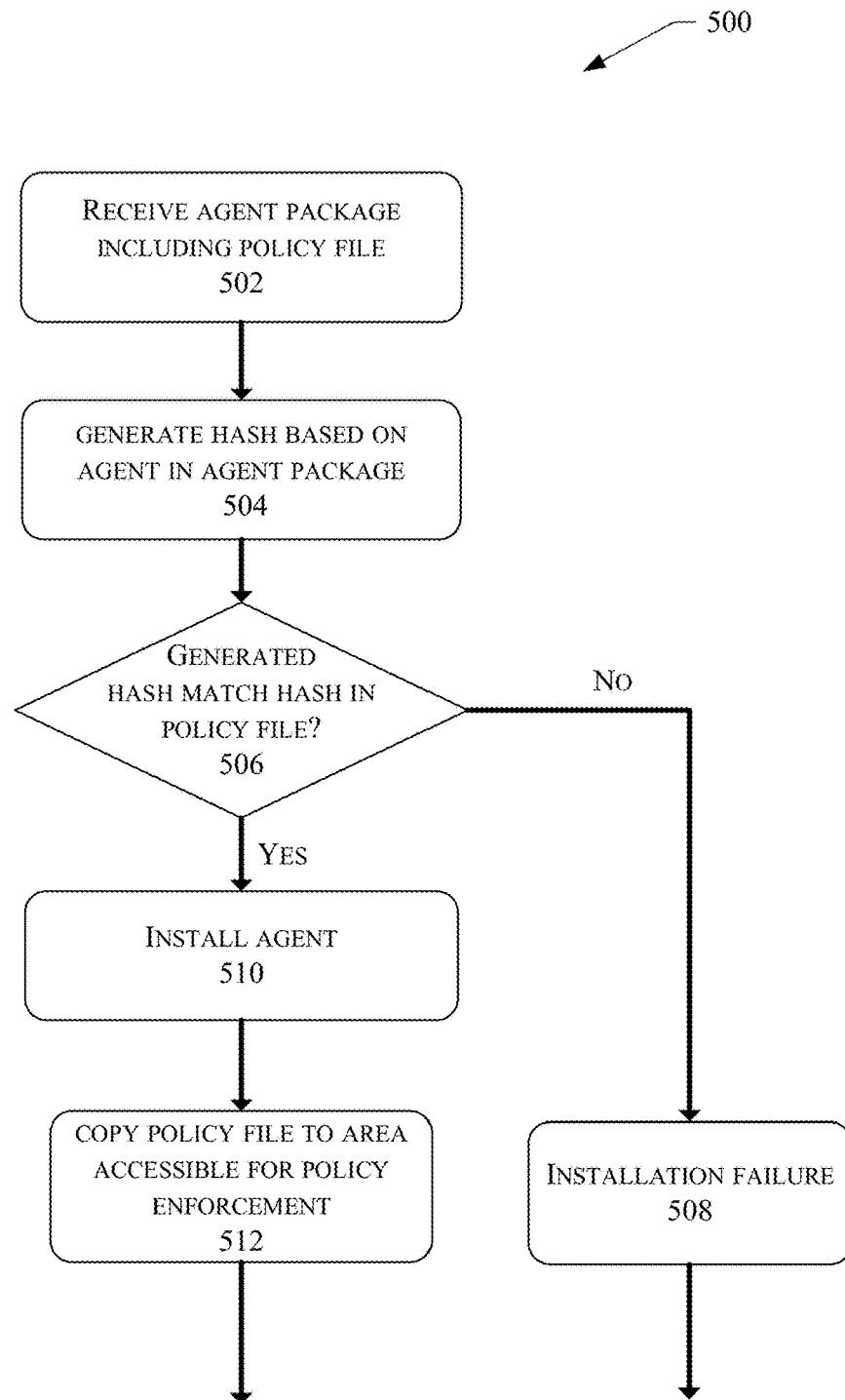
FIG. 5 is a flowchart illustrating an example agent installation process, to install an agent within a platform on a network communication device, where the agent has an associated policy file.

FIG. 5 is a flowchart illustrating an example agent installation process, to install an agent within a platform on a network communication device, where the agent has an associated policy file. The process 500 (as well as each process described herein) is illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Referring to FIG. 5, at 502, the installation process receives an agent package including a policy file. The policy file includes a hash of the executable (binary) of the agent, thus tightly coupling the policy file to a specific version of the agent. For example, the hash may be generated, at 504, using an SHA256 hash algorithm. In addition, the agent package itself may be signed.

At 506, the installation process determines whether the hash generated by the installation process at 504 matches the hash included in the policy file. If the hash generated by the installation process does not match the hash included in the policy file, then this may be an indication that the policy file has been tampered with and/or that a spoof of the policy file has been attempted. In this situation, at 508, the installation fails. Failure processing at 508 may include, for example, reporting the failure to a service provider and/or DI application.

If the hash generated by the installation process does match the hash included in the policy file, the installation process installs the agent at 510. This may include, for example, extracting the agent from the agent package. At 512, the installation process copies the policy file, received in the agent package, to an area that is accessible to a policy enforcement process, such as the AppServer 432.

With regard to agent registration, a registration process may similarly generate a hash based on the agent and compare the generated hash to a hash contained in a policy file associated with the agent being registered. If the generated hash does not match the hash contained in the policy file, then the registration may be refused. For example, this may be an indication that the policy file has been tampered with and/or that a spoof of the policy file has been attempted after the agent has been installed but before the agent has been registered.

Figure 6:
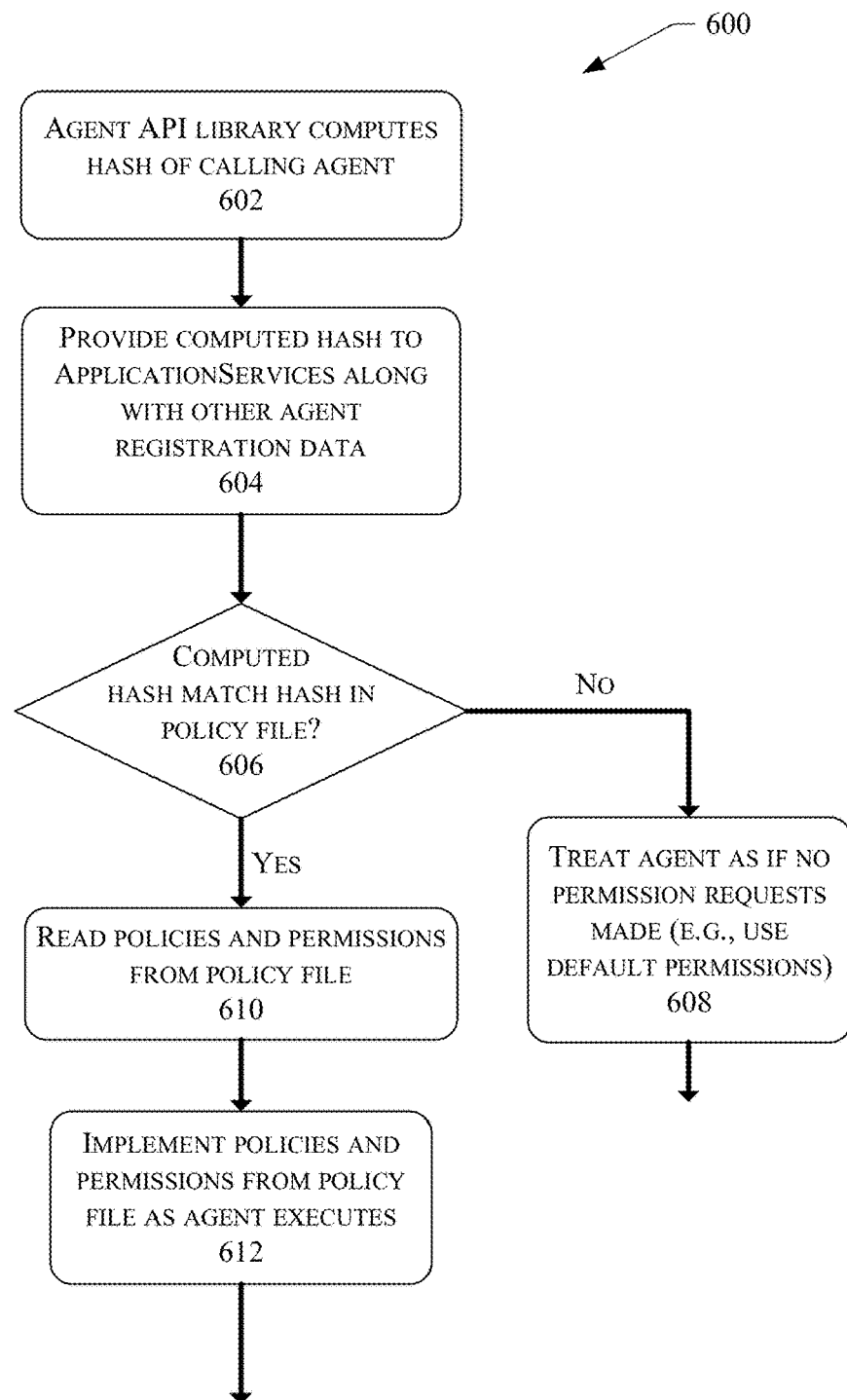
FIG. 6 is a flowchart illustrating an example process which may be carried out by a network communication device when, for example, an agent calls an application programming interface (API) to access resources of the network communication device.

FIG. 6 is a flowchart illustrating an example process 600 which may be carried out by a network communication device when, for example, an agent calls an API to access resources of the network communication device. At 602, the agent API library computes the hash of the calling agent, such as by computing the hash over the executable (binary) of the calling agent. At 604, the agent API provides the computed hash along with other agent registration data, to the AppServer or other process that is, among other things, configured to regulate access by agents to the resources of the network communication device.

At 606, the App Server determines if the computer hash matches the hash from the policy file corresponding to the calling agent. If the computed hash does not match the hash from the policy file corresponding to the calling agent then, at 608, a determination is made to treat the calling agent as if no permission requests have been made via the policy file—in other words, using default permissions.

Otherwise, if the AppServer determines the computed hash matches the hash from the policy file corresponding to the calling agent then, at 610, the AppServer reads the policies and permissions from the policy file. At 612, the AppServer implements the policies and permissions, from the policy file, as the calling agent executes. For example, the App Server may implement the policies and permissions in a manner consistent with the discussion above of the XML-formatted policy file and the nodes of that policy file.

Figure 7:
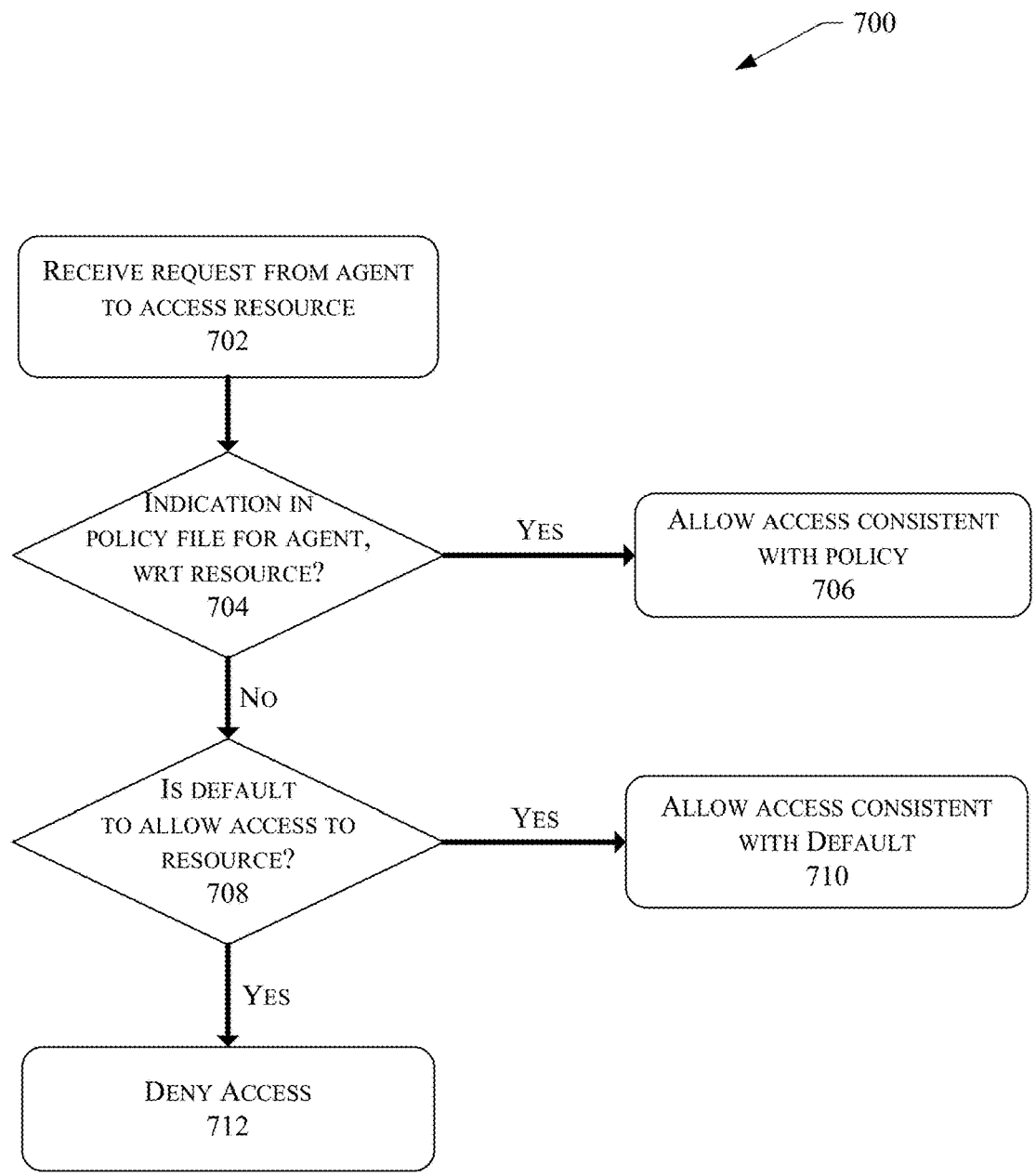
FIG. 7 is a flowchart illustrating an example of operations an application server may carry out to implement policies and permissions, from a policy file, as a calling agent executes.

FIG. 7 is a flowchart illustrating an example process 700 that the AppServer may carry out to implement the policies and permissions, from the policy file, as the calling agent executes. At 702, the AppServer receives a request from a calling agent to access a resource of the network communication device.

At 704, the AppServer determines if the policy file corresponding to the calling agent includes an indication of a policy for the calling agent with respect to the resource the calling agent is requesting to access. If the AppServer determines the policy file corresponding to the calling agent includes an indication of a policy for the calling agent with respect to the resource the calling agent is requesting to access then, at 706, the AppServer allows the calling agent access to the requested resource in a manner consistent with the indication in the policy file by, for example, exposing the requested resource to the calling agent.

Otherwise, at 708, the AppServer determines if a default is to allow the calling agent access to the requested resource. If the AppServer determines a default is to allow access to the requested resource then, at 710, the AppServer allows access to the requested resource in a manner consistent with the default. If the AppServer determines there is no default to allow access to the requested resource, then at 712 the AppServer denies the calling agent access to the requested resource.

CONCLUSION

The techniques disclosed herein may address issues that may arise when multiple agents on an IoT endpoint have unrestricted access to the capabilities and/or features of the IoT endpoint, such as resource overload and/or threats to privacy and/or security. Among other things, the disclosed techniques may provide a mechanism to intelligently enforce access to the capabilities and/or features of the IoT endpoint.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to control access to resources, comprising:
by a hosted distributed intelligence (DI) application, communicating with an agent operating on a network communications device;
by the agent on the network communications device, communicating with the hosted DI application, wherein an access policy file corresponding to the agent includes a certificate securely associating the access policy file with the agent; and
by the network communications device, based at least in part on the access policy file, exposing one or more resources of the network communications device to the agent to provide the agent with access to the one or more resources indicated by the access policy file, wherein the hosted DI application is able to access the one or more resources through operation of the agent.

2. The method of claim 1, wherein:
the network communications device is a smart utility meter; and
exposing the one or more resources comprises exposing metering data obtained by the smart utility meter.

3. The method of claim 1, wherein the access policy file governs functionality comprising:
upstream network data limits for each of the one or more resources indicated in the access policy file.

4. The method of claim 1, wherein the access policy file governs functionality comprising:
a load control switch configured to selectively enable and disable energy loads.

5. The method of claim 1, wherein the access policy file governs functionality comprising:
gathering of high-speed data related to energy usage and other energy-related parameters.

6. The method of claim 1, wherein the access policy file governs functionality comprising:
peer-to-peer communications with a smart electric meter or other communications device.

7. The method of claim 1, wherein the access policy file governs functionality comprising:
tightly coupling each of a plurality of access policy files to a corresponding agent.

8. A system to control access to resources, comprising:
a hosted distributed intelligence (DI) application; and
a network communications device, comprising:
one or more resources;
an agent container; and
an agent operating within the agent container, wherein the agent is configured to include a certificate securely associating an access policy file with the agent, and wherein the agent is configured to perform acts comprising:
communicating with the hosted DI application;
receiving, based at least in part on permissions of the access policy file, resources from the network communications device; and
providing access to the resources to the hosted DI application.

9. The system of claim 8, wherein:
the agent container comprises a plurality of agents; and
each agent from among the plurality of agents is prioritized with respect to other agents from among the plurality of agents, and wherein an order of termination of the agents is based at least in part on a priority of each agent.

10. The system of claim 8, wherein the access policy file of the agent specifies how the agent may publicize information about each feature that the agent supports.

11. The system of claim 8, wherein the access policy file governs whether the agent of the network communications device is subscribable only by devices internal to a network of the system or also by devices external to the network of the system.

12. The system of claim 8, wherein the access policy file indicates specific network data limits for features supported by the agent.

13. The system of claim 8, wherein the access policy file is configured in eXtensible Markup Language (XML) statements and organized as categories of an ordered labelled tree.

14. The system of claim 8, wherein the network communications device comprises electricity usage metrology circuitry.

15. The system of claim 8, wherein an access control function of the agent defines an amount of resources the agent is permitted to consume prior to the access control function raising an alarm or blocking another agent from further consumption of the resources of the agent.

16. One or more non-transitory computer-readable media storing computer-executable instructions that, when executed by one or more processors, configure a system to control access to resources and perform acts comprising:
by a hosted distributed intelligence (DI) application, communicating with an agent operating on a network communications device;
by the agent on the network communications device, communicating with the hosted DI application, wherein an access policy file corresponding to the agent includes a certificate securely associating the access policy file with the agent; and
by the network communications device, based at least in part on the access policy file, exposing one or more resources of the network communications device to the agent to provide the agent with access to the one or more resources indicated by the access policy file, wherein the hosted DI application is able to access the one or more resources through operation of the agent.

17. The one or more non-transitory computer-readable media of claim 16, wherein an access control function of the agent determines what to do with data after transmission of the data is blocked due to a limit on resources.

18. The one or more non-transitory computer-readable media of claim 16, wherein the agent comprises a plurality of features, and wherein at least one of the features is utilized by a second agent of the network communications device.

19. The one or more non-transitory computer-readable media of claim 16, wherein the agent comprises a plurality of features, and wherein one of the plurality of features outputs an alarm responsive to electrical line voltage being measured by a sensor falling below a threshold value.

20. The one or more non-transitory computer-readable media of claim 16, wherein the agent comprises a plurality of features, the features comprising:
- communicating with other network communications devices;
- accessing data corresponding to environmental measurements; and
- controlling a switch to enable or disable electricity consumption by a device.

\* \* \* \* \*